Figure 1:
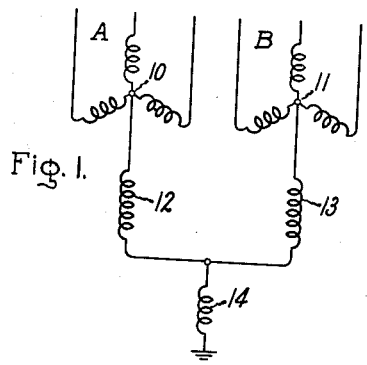

Aug. 20, 1940.  W. KÖCHLING  2,212,399
PROTECTION OF ALTERNATING CURRENT ELECTRIC SYSTEMS
Filed April 26, 1940  2 Sheets-Sheet 1

Inventor:
Wilhelm Köchling,
by Harry E. Dunham
His Attorney.

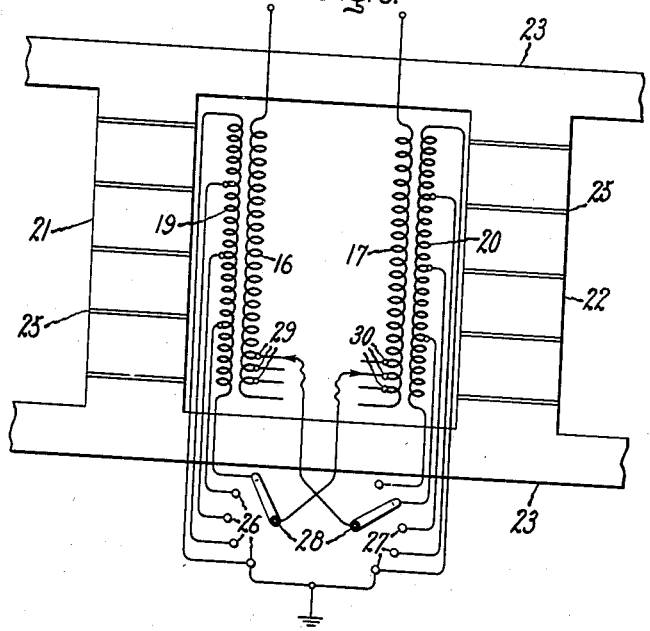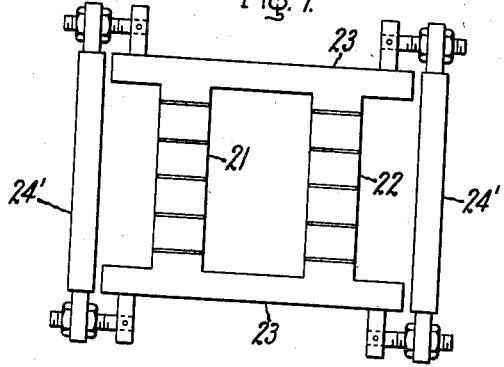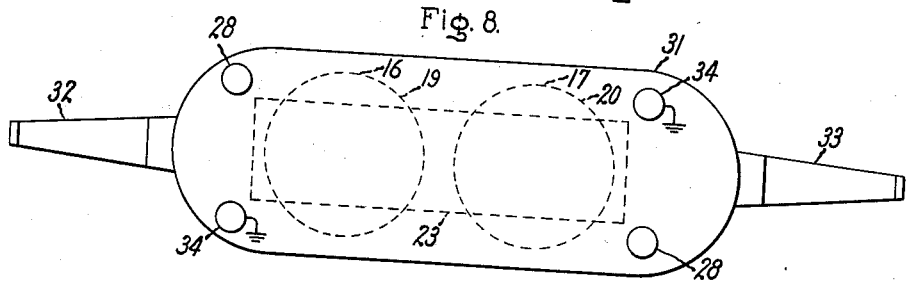

Patented Aug. 20, 1940

2,212,399

UNITED STATES PATENT OFFICE 2,212,399

PROTECTION OF ALTERNATING CURRENT ELECTRIC SYSTEMS

Wilhelm Köchling, Lubars, Germany, assignor to General Electric Company, a corporation of New York Application April 26, 1940, Serial No. 331,875
In Germany January 20, 1939

6 Claims. (Cl. 171—97)

My invention relates to improvements in the protection of alternating current electric systems against arcing ground faults. In United States Letters Patent 1,537,371 there is disclosed means for suppressing arcing ground faults by an inductive device which is known to the art variously as a Petersen coil, ground fault neutralizer, etc. This device is so connected to a power line and has its inductance so proportioned as to provide on the occurrence of a ground on one phase conductor of the line a lagging current sufficient to suppress or neutralize the unbalanced charging or leading current to ground of the ungrounded conductors of the line. It is common to connect this neutralizing inductance between a neutral point of the line and ground.

Many extensive power systems have two relatively long power lines supported on the same towers. If these power lines are of the same voltage and frequency and the neutral point of one is directly metallically connected to a neutral point of the other through a connection having substantially no impedance, then a single ground fault neutralizer may be connected between the common neutral connection and ground. In this case no additional coil or coils are required for compensating for the mutual capacitance between lines. If, however, the voltages of the lines differ or the systems are not directly metallically connected, then on the occurrence of a ground fault on a phase conductor of one line the mutual capacitance of the lines tends to change the potential of the neutral points of the other sound line or lines. This may overstress the insulation of the neutrals. Furthermore, if it is necessary to have a ground fault neutralizer for each of the lines, then the effect of this mutual capacitance current must be carefully considered if the desired arcing ground suppression is to be obtained. Heretofore for this purpose drainage coils and booster transformers have been used in addition to and connected with the ground fault neutralizers. For example, in systems having the same voltage and frequency a drainage coil has been used, and in systems of different voltage a booster transformer has been used.

One object of my invention is to provide an improved protective arrangement whereby, under the conditions of mutual capacitance outlined, the desired earth fault suppression is assured. A further object of my invention is to accomplish the desired arcing ground suppression with a single device in order to reduce space requirements and cost. A further object of my invention is to provide an arrangement which can be used with lines of the same or different voltages, and which permits a readily flexible adjustment for different lines. These and other objects of my invention will appear in more detail hereinafter.

My invention will be better understood from the following description when considered in connection with the accompanying two sheets of drawings, and its scope will be pointed out in the appended claims.

Figure 2:
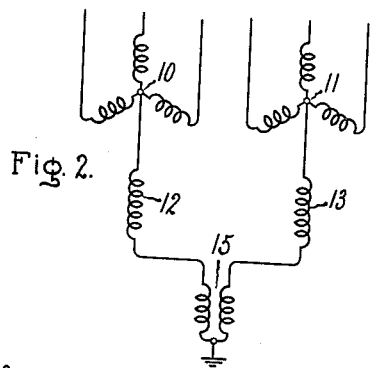
Figure 3:
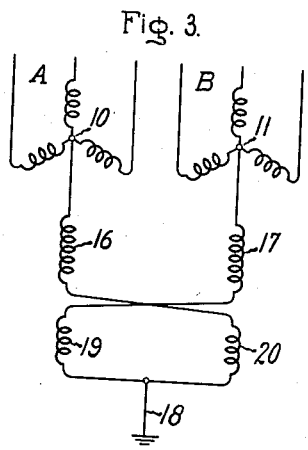
Figure 4:
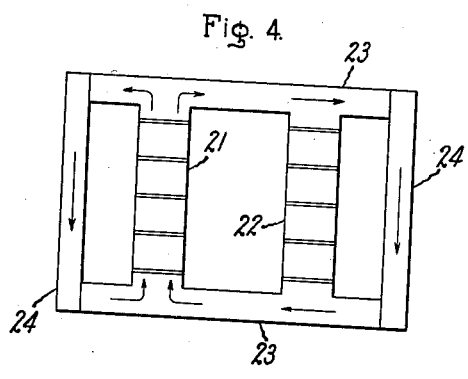
Figure 5:
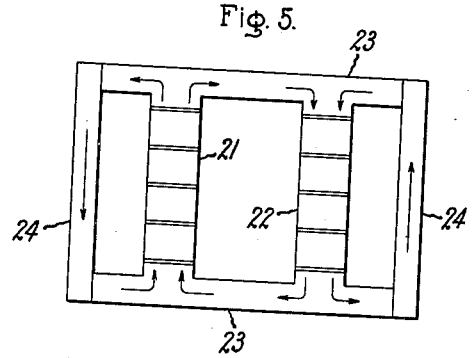

In the accompanying drawings Figs. 1 and 2 illustrate diagrammatically arcing ground suppressor arrangements embodying a drainage coil and a booster transformer, respectively; Fig. 3 illustrates diagrammatically an arcing ground suppressor arrangement embodying my invention; Figs. 4 and 5 are diagrams explanatory of the embodiment of my invention shown in Fig. 3; Fig. 6 illustrates diagrammatically a ground fault neutralizing device embodying my invention; Fig. 7 illustrates diagrammatically a modification of the embodiment of my invention shown in Fig. 6; and Fig. 8 illustrates diagrammatically a top view of the embodiment of my invention shown in Fig. 6.

In the arcing ground suppressor arrangements shown in Figs. 1, 2 and 3 two power lines A and B having neutral points 10 and 11, respectively, are assumed to be so supported and of such a length as to have an appreciable mutual capacitance such that, in case of a ground fault on a phase conductor of one line, there would result an undesirable flow of leading current from the other line to the ground fault if the neutrals of both lines were grounded. Thus if lines A and B are connected to ground, respectively, through ground fault neutralizers 12 and 13, as shown in Figs. 1 and 2, then on the occurrence of a ground on one of the phase conductors of line A, for example, the potential of the neutral 10 of this line relatively to ground is raised to the line-to-ground or star voltage of the line. In consequence of this and the mutual capacitance between the lines A and B there results a leading current which flows through the neutral point 11 of the line B to ground and raises the potential of this neutral point. This may not only overstress the insulation of this neutral point but also interfere with the correct operation of the ground fault neutralizers.

It has been proposed to suppress this leading current flow by an auxiliary or biasing potential applied to the neutral of the sound line. Thus, where the lines are of the same voltage and frequency, it has been proposed to obtain this biasing or compensating voltage by an auxiliary device, in addition to the ground fault neutralizers, such as a drainage coil 14, as shown in Fig. 1, but, where the lines differ in voltage, to employ an auxiliary device, such as a booster transformer 15, as shown in Fig. 2.

In accordance with my invention, I so magnetically interlink the windings of the ground fault neutralizers themselves as to obtain the necessary inductive biasing or compensating potential required in case of a ground fault on one of the systems as to eliminate the necessity for any additional auxiliary means, such as drainage coils and booster transformers.

Thus referring to Fig. 3 which illustrates diagrammatically the fundamental circuit according to my invention, the lines A and B are provided with earth leakage coils or ground fault neutralizers 16 and 17, respectively, which have a common earth lead 18. Also I provide winding parts 19 and 20 which may in some cases be tapped off the main windings 16 and 17 and which interlink these windings.

With this arrangement if a phase conductor of the line A is grounded, for example, the earth leakage current flows in the ground fault neutralizer 16 connected to the neutral 10 of this line and in the winding part 20 of the ground fault neutralizer 17 connected to the neutral 11 of the line B. Therefore, the ground fault neutralizer 17 of the line B is, through the direct excitation of winding part 20 and the indirect excitation of winding part 19, brought to a biasing or compensating potential which corresponds to the capacitive biasing potential of the unfaulted or sound line B such that a complete arc extinguishing effect is attained.

In comparison with the known arrangements, apparatus embodying my invention has the advantage that it can be used with lines of the same voltage and current loading as well as those which differ in these respects. Only the number of winding turns and core cross section have to be considered. Also the saving of material through the elimination of auxiliary apparatus is of particular value. Moreover, the serviceability as a single earth leakage coil or ground fault neutralizer is not interfered with in any way. On the contrary, it is an advantage that, in case of single line operation, the additional winding otherwise required, as compared with drainage coil operation, is available to provide additional neutralizing effect in ground fault neutralizers embodying my invention. It is also possible by simple changeover switches to vary the coupling of the coils so that the number of turns of the windings 19 and 20 are gradually interchanged. In order to avoid deadend turns and oscillatory effects possible therewith, it is desirable to obtain the necessary tappings for the regulation of the coil currents in the winding parts 16 and 17 by series or parallel connection of winding parts and the regulation tappings required for the coupling by switching operations as will hereinafter appear.

Further in accordance with my invention, the arcing ground suppressor arrangement for lines having relatively high mutual capacitance may be simplified by assembling the necessary earth leakage or neutralizing coils upon a common magnetic core. This may be accomplished by having a core leg for each earth leakage coil. Thus, for example, Figs. 4, 5 and 6 show such a core structure for two lines wherein the legs 21 and 22, which carry the two earth leakage or neutralizing coils 16—20 and 17—19, as shown schematically in Fig. 6, are surrounded by cover yokes 23 and end closing legs 24 which may have about half the cross section of one of the center legs. As indicated schematically in Fig. 6, the winding parts 16 and 19 are on the core leg 21, and the winding parts 17 and 20 are on the core leg 22. The core legs 21 and 22 may be provided with one or more gaps 25 as is often done in the construction of ground fault neutralizers. The winding parts 16, 17, 19 and 20 have their turns so wound and connected relatively to each other that, in case of an arc to ground on a phase conductor of either of the lines A or B, the lagging current to ground through these windings is substantially equal to the leading current to ground at the fault, such leading current including, of course, the unbalanced charging current to ground of the ungrounded conductors of the faulty line and the mutual capacitive current between lines.

If it be assumed, for example, that there is an arc to ground on one of the phase conductors of the line A, then the arrows shown in Fig. 4 indicate the course of the fluxes in the magnetic circuit. If, on the other hand, it should so happen that arcs to grounds occurred simultaneously on both lines A and B, then the course of the fluxes in the core would be as shown in Fig. 5. It will be apparent from Fig. 5 that the winding parts 16, 17, 19 and 20 are so arranged on the legs 21 and 22 that the direction of the flux in one of these legs is opposite to the direction of the flux in the other leg. If the yokes 23 and end legs 24 are about half the cross section of the legs 21 and 22, then when either one or both earth leakage coils are in service, the flux outside of the legs 21 and 22 does not exceed half of the flux in these legs. Obviously arc suppressing arrangements embodying my invention are not only of advantage for lines having a relatively high mutual capacitive coupling but also operate favorably where only a single line is involved.

If, for example, there is used for two lines a single ground fault neutralizer with a common core, then the inductive coupling, in accordance with my invention, of the two earth leakage or neutralizing coils may be attained without the use of auxiliary winding parts. Thus, as shown, in Fig. 7 adjustable air gaps may be provided, for example, at the junction points of the outer legs 24' and the yokes 23 by means of which the magnetic interlinking of the two earth leakage coils can be varied. However, if the interlinking is attained by means of the auxiliary winding parts 19 and 20, as shown in Fig. 6, these auxiliary winding parts may be equipped with taps. Thus, as shown in Fig. 6, the arrangement is such that the auxiliary winding parts 20 and 19 are tapped off from the main windings 16 and 17 on the legs 21 and 22. Thus, as shown, the auxiliary winding parts 19 and 20 are provided with taps 26 and 27 connected through the tap-changing switch 28 to the main winding parts 16 and 17. The main winding parts 16 and 17 may also be provided with taps 29 and 30 for controlling the earth leakage coil currents.

In those cases where it is desired to ship by rail apparatus embodying my invention and ready for operation, the lead-ins or bushings may be arranged horizontally or approximately so in order to reduce vertical and transverse clearance requirements. Such an embodiment of my invention is illustrated by way of example in Fig. 8. Thus in Fig. 8 a casing or container 31 contains the core 23 on which the winding parts 16, 17, 19 and 20 are arranged. Lead-in bushings 32 and 33 are shown at the ends of the casing 31. On the cover of this casing are indicated schematically the tap-changing switches 28 and earthing terminals 34.

While I have shown and described my invention in considerable detail, I do not desire to be limited to the exact arrangements shown, but seek to cover in the appended claims all those modifications that fall within the true spirit and scope of my invention.

What I claim as new and desired to secure by Letters Patent of the United States, is:

1. A ground fault neutralizing arrangement, for two alternating current power lines each having a neutral point connected to ground and both so supported relatively to each other that on the occurrence of a ground fault on a phase conductor of one line a capacitive current tends to flow between the lines and into the ground fault, comprising two windings respectively connected between said neutral points and ground and so proportioned and magnetically interlinked as to provide on the occurrence of a ground fault on a phase conductor of one line a lagging current to ground substantially equal to the capacitive current to ground of the ungrounded conductors of the faulty line and the capacitive current interchange between the lines.

2. A ground fault neutralizing arrangement, for two alternating current power lines each having a neutral point connected to ground and both so supported relatively to each other that on the occurrence of a ground fault on a phase conductor of one line a capacitive current tends to flow between the lines and into the ground fault, comprising two windings respectively connected between said neutral points and ground and so proportioned and magnetically interlinked as to provide on the occurrence of a ground fault on a phase conductor of one line a lagging current to ground for substantially neutralizing the capacitive current to ground of the ungrounded conductors of the faulty line and the capacitive current interchange between the lines.

3. A ground fault neutralizing arrangement, for two alternating current power lines each having a neutral point connected to ground and both so supported relatively to each other that on the occurrence of a ground fault on a phase conductor of one line a capacitive current tends to flow between the lines and into the ground fault, comprising two windings respectively connected between said neutral points and ground and so proportioned and magnetically interlinked as to provide on the occurrence of a ground fault on a phase conductor of either of said lines a lagging current to ground substantially equal to the capacitive current to ground of the ungrounded conductors of the faulty line and the capacitive current interchange between the lines.

4. A ground fault neutralizing arrangement, for two alternating current power lines each having a neutral point connected to ground and both so supported relatively to each other that on the occurrence of a ground fault on a phase conductor of one line the capacitive coupling between the lines tends to change the potential of the neutral point of the other line relatively to ground, comprising two windings respectively connected between said neutral points and ground and respectively proportioned to neutralize arcing grounds on said lines and so magnetically interlinked as to provide on the occurrence of a ground on a phase conductor of one line a potential for substantially suppressing the interline capacitive current whereby to prevent the change in potential of the neutral point of the other line due to said capacitive coupling.

5. A ground fault neutralizing arrangement, for two alternating current power lines each having a neutral point connected to ground and both so supported relatively to each other that on the occurrence of a ground fault on a phase conductor of one line the capacitive coupling between the lines tends to change the potential of the neutral point of the other line relatively to ground, comprising two windings respectively connected between said neutral points and ground and respectively proportioned to neutralize arcing grounds on said lines and so magnetically interlinked as to provide on the occurrence of a ground on a phase conductor of one line a potential for substantially suppressing the interline capacitive current whereby to prevent the change in potential of the neutral point of the other line due to said capacitive coupling, each of said windings including a main portion and an auxiliary portion, a magnetic structure comprising two winding legs respectively carrying the main and the auxiliary portions of said windings in reverse order, and switching means for varying the number of turns of each portion of one of said windings connected in circuit between its respective neutral point and ground.

6. A ground fault neutralizing arrangement, for two alternating current power lines each having a neutral point connected to ground and both so supported relatively to each other that on the occurrence of a ground fault on a phase conductor of one line the capacitive coupling between the lines tends to change the potential of the neutral point of the other line relatively to ground, comprising two windings respectively connected between said neutral points and ground and respectively proportioned to neutralize arcing grounds on said lines and so magnetically interlinked as to provide on the occurrence of a ground on a phase conductor of one line a potential for substantially suppressing the interline capacitive current whereby to prevent the change in potential of the neutral point of the other line due to said capacitive coupling, each of said windings including a main portion and an auxiliary portion, and a magnetic structure comprising two winding legs respectively carrying the main and the auxiliary portions of said windings in reverse order.

WILHELM KÖCHLING.